United States Patent [19]

Lee

[11] Patent Number: 4,899,394
[45] Date of Patent: Feb. 6, 1990

[54] APPARATUS AND METHOD FOR IMAGE COMPRESSION

[75] Inventor: Jeffery H. Lee, Cupertino, Calif.

[73] Assignee: Prodigy Systems Corporation, Mountain View, Calif.

[21] Appl. No.: 861,510

[22] Filed: May 9, 1986

[51] Int. Cl.$^4$ .............................................. G06K 9/18
[52] U.S. Cl. .......................................... 382/9; 382/56
[58] Field of Search ....................... 382/36, 50, 48, 56, 382/9; 364/518

[56] References Cited

U.S. PATENT DOCUMENTS

| | | | |
|---|---|---|---|
| 3,394,352 | 7/1968 | Wernikoff | 364/900 X |
| 3,646,257 | 2/1972 | Epstein et al. | 382/56 X |
| 3,727,184 | 4/1973 | Roza et al. | 382/48 |
| 3,818,445 | 6/1974 | Neville | 382/48 X |
| 4,503,556 | 3/1985 | Scherl et al. | 382/48 X |
| 4,504,972 | 3/1985 | Scherl et al. | 382/9 X |
| 4,554,593 | 11/1985 | Fox et al. | 382/50 X |
| 4,677,479 | 6/1987 | Hatori et al. | 382/50 X |

Primary Examiner—Gary V. Harkcom
Assistant Examiner—Mark K. Zimmerman
Attorney, Agent, or Firm—Skjerven, Morrill, MacPherson, Franklin & Friel

[57] ABSTRACT

A system for compressing the digitized images of documents so that they take up less memory space. The system is comprised of discrimination logic which scans the uncompressed image vertically in a swath through the middle of the raster lines and collects data regarding the raster lines which have a number of black pixels which exceed a user defined threshold. Interrupts are generated to cause a microprocessor to collect the data and write a vertical profile of the document. The microprocessor then causes the discrimination logic to scan unsuspected text lines horizontally and collect data regarding the columns which have a number of black pixels which exceed a user defined threshold. Interrupts are generated to cause the microprocessor to collect the data and write a horizontal document profile. After the profiling stage, the microprocessor examines the profiles and determines the zones wherein the blank spaces are integer multiples of the smallest blank spaces and labels these zones as text. The microprocessor then identifies these text zones to a compression engine which deletes every other pixel on each line and deletes every other line in text zones.

3 Claims, 3 Drawing Sheets

APPARATUS AND METHOD FOR IMAGE COMPRESSION

BACKGROUND OF THE INVENTION

The invention pertains to the field of image compression for compact, electronic storage, and, more particularly, to the field of mapping an input document into zones of text and zones of graphics and compressing each zone at a different resolution in terms of bits or pixels per linear inch.

With the growing volume of documents stored in the files of businesses all over the world, and the rising cost of storing such paper documents, there has arisen a need for storing such documents more compactly. Optical disk technology has provided a medium which can store vast quantities of data for archival purposes. However, even with optical disk technology for storage of data, there still exists a need for efficiency in the digitizing of input documents to avoid excess storage of data where extreme resolution is not necessary to accurately reproduce the appearance of the document in a particular zone.

It has been found that most documents have large quantities of blank space at locations between lines of text, between words, in the margins, and in the areas of the document devoted to text data as opposed to graphic data. It has also been found that areas of text in a page may be accurately reproduced with a storage resolution of 100 dots or pixels per linear inch, while graphic data may be accurately reproduced at a storage density of 200 dots per linear inch.

Thus, there has arisen a need for a system which can map an input document into zones of text and zones of graphic data, and which can compress a bit mapped electronic representation of the document such that zones of text are stored at 100 pixels per linear inch while graphic zones are stored at 200 pixels per linear inch.

SUMMARY OF THE INVENTION

In accordance with the teachings of the invention, an apparatus and method of operating same is provided which fills the above-identified need. The apparatus of the invention includes a frame buffer for storing a bit-mapped, raster-scanned representation of the input document. The frame buffer stores an image of a document which has been scanned and digitized by conventional means. The frame buffer pixel data is accessed by a microprocessor and its associated discrimination logic for purpose of mapping text and graphic zones in the document. Text zones are determined in a probablistic manner by mapping the document both vertically and horizontally to generate a profile of the document. The vertical profile indicates which raster scan lines are probably character lines by looking for black pixels and which scan lines are probably blank lines by looking for an absence of black pixels. The horizontal profile of the document indicates for those scan lines which are probably text lines which column are "while" and which are "black". User definable thresholds are used to make these determinations. The document is then mapped into zones of text and zones of graphics by determinations from the horizontal and vertical profiles the smallest inter text line space and the smallest inter character space. The probable text line zones are then further examined to make a determination of how many of the other blank spaces horizontally are integer multiples of the smallest intercharacter space and how many of the inter text blank line spaces are integer multiples of the smallest inter text line space. If the number of violations of the integer multiple rule exceeds a user definable threshold, then the zone is labeled a graphics zone. If the violations of the integer multiple rule do not exceed the threshold, the zone is labelled text. In some embodiments, the mapping may be done by determining the number of violations in only the vertical direction or only in the horizontal direction. The probability of being right increases however if more passes through the horizontal and vertical profiles are made to determine regularity or conformity with the integer multiple rule.

The vertical profile is an array or date base containing the scan line number of all scan lines thought to be character or text lines. Every scan line number is in the data base with a tag appended thereto which indicates whether it is thought to be part of a text line or a blank line. The vertical profile is built as follows. In the preferred embodiment, the discrimination logic examines the document in two passes. The first pass is devoted to building the vertical profile. In the first pass, the discrimination logic finds the first scan line which is thought to be the top of a text line (typically a text line may encompass 15 to 35 raster scan lines) by scanning a 16-pixel wide swath of pixels down the middle of the document. Each group of 16 pixels in the middle of each scan line is input to a logic block which determines the number of pixels in the 16 bit word which are black. The output of this logic block is a binary number indicating the number of black pixels in the word. This binary word is compared in a comparator to a user definable threshold value to determine if the number of black pixels exceeds the threshold. If it does, the scan line number of the line is recorded in a register for later reading by the microprocessor. If it does not, then the next 16 bit word from the middle of the next scan line is accessed from the frame buffer and the number of black pixels is compared to the threshold. This process is continued until the first scan line with a number of black pixels which exceeds the threshold is found. When it is found, the scan line number is stored in the first black line storage register, and the discrimination logic switches to a mode of looking for blank lines.

The mode of looking for the first blank line is substantially similar to looking for the first black line. The scan line counter is incremented, and the next 16 bit word from the middle of the next scan line is brought into the discrimination logic. The discrimination logic then determines whether the number of black pixels exceeds the user defined threshold. If it does, the scan line counter is incremented, and the 16 bit word from the middle of the next scan line is brought into the discrimination logic to have it's number of black pixels compared to the threshold. This process continues until the first scan line is found where the number of black pixels is less than the user defined threshold. When this scan line is found, an interrupt is generated to the microprocessor. The service routine for this interrupt causes the microprocessor to read the contents of the first black scan line number storage register (hereafter the "first black register") and to read the current count of the scan line counter. The microprocessor then constructs a table in a document profile memory wherein the first text line scan line number will be written to an array or data base as a data record and given a "possible text" label. The current count of the scan line counter will then be written to the data base or array with a "blank line" label. All the scan line numbers between the first black scan line number and the first blank scan line number will also be written to the data base with "possible text line" labels.

The process then repeats itself in that it reverts back to the mode of looking for the next scan line where the number of black pixels exceeds the user defined threshold. When this next "first black" scan line is found, its scan line number is written into the first black register. The discrimination logic then enters a mode of looking for the first blank line following this newly found first black line. When the first following blank line is found, another interrupt is generated, and the microprocessor again executes the service routine described above to add further data to the vertical profile data base.

The foregoing process is repeated until the scan line count equals the scan line count of the last scan line on the page. In some embodiments, the microprocessor will at this time map the document into text and graphic zones by looking at the vertical profile and finding the smallest inter line space (hereafter SIS). This will be the smallest grouping of all blank scan lines in the vertical profile. Once this SIS number is found, all the other groupings of blank line in the vertical profile are compared to the SIS to determine if they are integer multiples of the SIS. The number of violations of this integer multiple rule is determined and compared to a user defined threshold. All zones where the number of violations is less than the threshold may be labelled text. This result is not as reliable as the result that may be obtained if a horizontal profile is built and examined with the same sort of analysis. In the preferred embodiment, both the horizontal and vertical profiles are examined before a region is labelled text. The vertical profile may be analyzed either as soon as it is completed or later after the horizontal profile is also completed.

At this time in the preferred embodiment, the discrimination logic switches into the horizontal scan mode to build the horizontal profile. This is done as follows. At the time that the scan line count equals the number of the last scan line, an interrupt is generated to the microprocessor. The service routine for this interrupt searches the vertical profile to determine the scan line number of the top scan line and the bottom scan line in the first grouping of "black" lines which is labelled "possible text". These scan line numbers are written to a storage register or registers in the discrimination logic in the preferred embodiment, but in other embodiments, they may be stored in the microprocessor's RAM and supplied upon request. These scan lines define the top and bottom limits of the plurality of columns which make up this particular text line.

The purpose of the discrimination logic on this horizontal scan of the text line so identified to the discrimination logic is to read all the pixels in each column in the text line and mark all boundaries between "blank" column and "black" columns. This process is performed for each text line identified in the vertical profile, but is done for only one text line at a time. The scan line counter is used in this mode to count the current column of pixels being examined and is incremented as each column of pixels is completed. A comparison circuit compares the current column count of the scan line counter to a value representing the number of columns across the page. An end-of-line interrupt signal is generated when the horizontal scan is completed as indicated by the result of said comparison. The service routine for this interrupt causes the microprocessor to send the scan line numbers of the top and bottom of the next text line in the vertical profile to the discrimination logic to define the sizes of the next columns to access from the frame buffer. A horizontal scan of this next text line is then performed. The object of these horizontal scans is to find all the blank spaces in the line and to build a horizontal profile of the document such that the smallest horizontal space may be determined. This smallest space will probably be the space between characters in words on the line. The function of the discrimination logic on the horizontal scan is only to generate interrupt signals such that the color change boundaries may be marked in the horizontal profile.

To do the mapping of the document into text and graphics zones, the microprocessor will later analyze the horizontal profile to fine the smallest horizontal blank space (hereafter ICS for intercharacter space) on text lines so analyzed. The system assumes that the smallest blank space it finds in a horizontal scan from left to right or form right to left will be an intercharacter space. Further, the system assumes that any larger blank spaces which are integer multiples of the intercharacter space will be interword spaces. The microprocessor compares the blank spaces in all the text lines so scanned to determine if the blank spaces therein are integer multiples of the ICS. The text lines where the number of violations, i.e., the number of horizontal blank spaces which are not integer multiples, is less than a user definable threshold are recorded as probable text zones. In the preferred embodiment, the vertical profile is also examined in the same way, and when both the vertical and horizontal profiles have been so examined, the text zones and graphics zones are mapped out.

The discrimination logic works as follows to generate the interrupts marking the blank spaces in the horizontal text lines. To perform this function, the microprocessor loads the discrimination logic with the address of the first scan line of the first text line from the vertical profile previously developed, and the number of scan lines vertically adjacent to each other which comprise that text line. For pica or elite typewritten documents single-spaced at six lines per inch, each text line will comprise approximately 33 scan lines at a 200 pixel per linear inch data density in the frame buffer. For smaller type faces, the number of vertically adjacent scan lines comprising a text line may be twenty or twelve. For purposes of illustration, assume that the next line is 20 pixels high. The discrimination logic will then access the 20 bits corresponding to the 20 vertically aligned pixels at the extreme left edge column (or the extreme right edge column) of the line. These 20 vertically aligned pixels will be applied to a PLA or other logic which generates a binary number representing the number of black pixels in the column. This binary number is then compared to a user definable threshold defining the minimum number of black pixels that must exist in a column to label that column a "black" column. As each column of pixels is completed, the scan line counter is incremented and the next column of pixels is brought into the discrimination logic for analysis. The line is processed in this manner, column by column until the first "black" column is found. Any column which has at least the minimum number of black pixel established by the user definable threshold will be considered to be a column that is within a character. The discrimination logic starts the horizontal scan by looking for the first "black" column. When it finds it, the column number is recorded in the same "first black" register (or a different one) used on the vertical scan. Once the first black column is found, the discrimination logic switches modes to begin looking for the first blank column following this first black column.

The objective in this new mode is to find the first column which has fewer black pixels in it than the maximum number of black pixels allowable per a user defined threshold defining a blank column. When the first blank column is found, an interrupt to the microprocessor is generated. This will signify that the column just previous to the current column was either the extreme right edge of a character or the extreme left edge of a character, depending upon which direction the line is being scanned. The service routine for this interrupt reads the address of the first black column from the first black register and the count of the scan line counter giving the current horizontal column address. The microprocessor then writes these two column addresses to the horizontal profile data base, and gives them the appropriate labels as black or blank. In some embodiments, the count address read will be a pre-incrementation address indicating that the column number next in sequence is the first blank column. In these embodiments, the current count read from the scan line counter is labelled as black because it is the address of the last black column in the "black run" before the blank column was found. These two addresses are recorded. The discrimination logic then switches modes again to begin looking for the next column with more than the user defined number of black pixels therein. The horizontal column counter is incremented again, and the next column is examined. When the next black column is found, its column address is again stored in the first black register. The discrimination logic then returns to the mode of looking for the next blank column. When it is found, an interrupt is again generated and the same service routine described above is again generated. When the text line has been completely scanned, the microprocessor will have a complete horizontal profile of the line giving all color change addresses. From these data records the number of columns in each black run and the number of columns in each blank run may be determined.

In some embodiments, discrimination logic generates an interrupt on each color change from black to white and from white to black. The direction of the change will be a data item which is read during the interrupt service routine. The processor keeps a separate table in the form of a linear array for each text line identified in the vertical profile. This table of linear arrays defines the spaces or blank runs found during horizontal scans of text lines. This table has as its row index the text line number from the vertical profile. Each text line number will correspond to a number of scan lines in the vertical profile compiled by the processor. In this horizontal profile table that the processor compiles, the text line currently being scanned has an array appended to it. This may be a linear array containing a plurality of numbers. The numbers signify the number of columns n each intercharacter or interword space. Each time the discrimination logic generates an interrupt during a horizontal scan, the service routine for that interrupt determines if the two column addresses define a black run or a white run. If the column addresses read during the interrupt defines a white run, the processor subtracts the two column addresses read during that interrupt service and places the result of the subtraction in the linear array appended to that next line as one element of the array defining the size of a blank horizontal space in the line. When the horizontal scan is completed, the array will contain a plurality of numbers having different values defining the sizes of all the blank spaces in the line. The processor then examines these numbers and locates the smallest one. This smallest number corresponds to the smallest intercharacter space in that particular text line and will be so designated as the ICS for that line. All the other numbers in the array will then be compared to this intercharacter space to determine whether they are multiples of the ICS. If the processor finds that the spaces in the line are integer multiples of the smallest intercharacter space, then the processor concludes that the text line just scanned is indeed a text line.

Those skilled in the art will appreciate that, at the point in time just after either the horizontal profile or the vertical profile is generated, whether or not a group of scan lines is a text zone or a graphics zone is not clear. This only becomes clear (in a probablistic sense) after an examination of the regularity of the spaces in the vertical and horizontal profiles. Any method of locating the spaces in both the vertical and horizontal direction and determining the relative sizes of these spaces will suffice for making this regularity determination and will allow the invention to be practiced.

Once these text and graphic zones are mapped, the processor directs compression logic to access the pixel data from the text zones and omit every other bit in both the horizontal and vertical directions. The data so compressed it then written by the compression logic onto an optical disk or a magnetic disk, into another frame buffer or to some other peripheral possibly by a network. The areas in the frame buffer designated as graphic areas will be accessed by the compression logic and written unchanged to the user apparatus.

DETAILED DESCRIPTION OF THE PREFERRED EMBODIMENT

Figure 1:
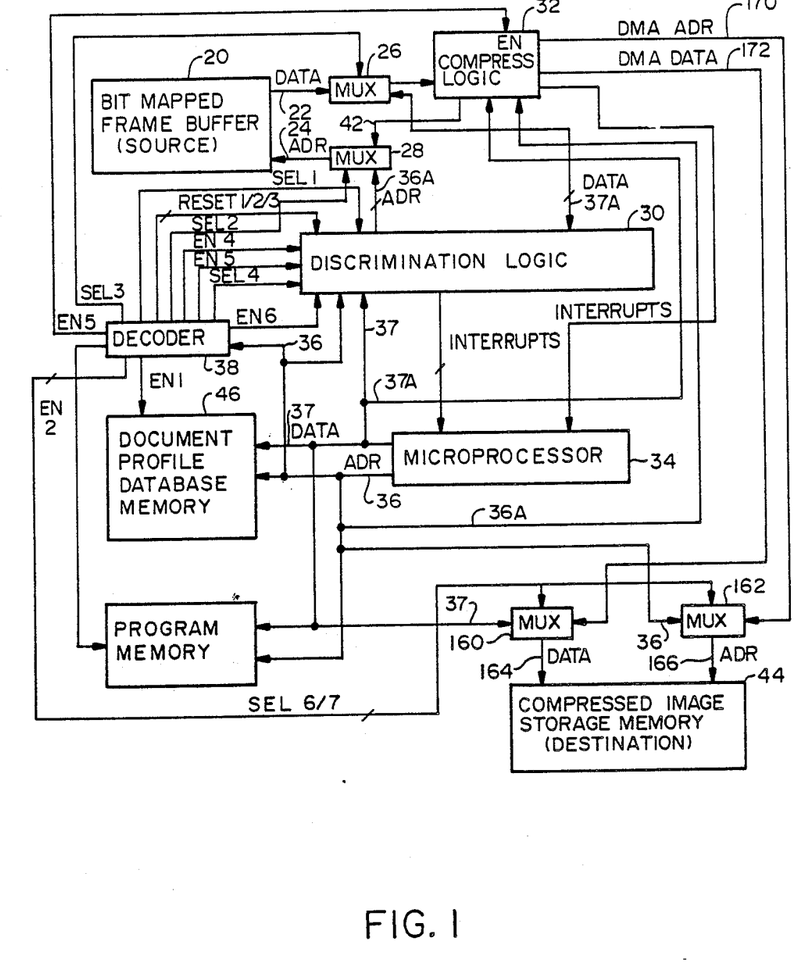
FIG. 1 is a block diagram of the system of the invention.

Referring to FIG. 1 there is shown a block diagram of the system of the invention. The document image to be compressed is digitized and stored in bit mapped fashion in a frame buffer 20. The data port 22 and the address port 24 are respectively controlled by multiplexers 26 and 28. The purpose of these multiplexers is to switch the address and data ports of the frame buffer to connection with the proper logic in the system which needs to control these ports at certain times. For example, during the operation of the system, the first phase after the image of a document has been digitized and stored in the frame buffer 20 is to do horizontal and vertical profiles of the document image to map the image into zones of text and zones of graphics. To do this, there is a subsystem called the discrimination logic 30 which must control the address and data ports of the frame buffer during this phase. After the document image has been mapped into zones of text and zones of graphics, a microprocessor orders a subsystem for compression of the image called the compress logic 32 to take control of the address and data ports of the frame buffer and compress the image such that text is converted to 100 pixels per linear inch resolution and graphics zones remain at 200 pixels per linear inch resolution. The compression logic does this resolution transformation by accessing the data in text zones and deleting every other bit in each row and deleting every other row. Any logic which can accomplish this function may be used for the compression logic 32, and its exact design is not critical to the invention. Those skilled in the art will appreciate numerous designs which may be used to accomplish this function.

A microprocessor 34 controls the system including the multiplexers 26 and 28 via the microprocessor address bus 36 and a decoder 38. This decoder decodes addresses on the address bus 36 and converts them to control signals which are routed to various enable and select inputs on the various logic subsystems in the system. The multiplexers 26 and 28 are controlled by control signals SEL 2 and SEL 3 from the decoder which are activated when the microprocessor writes the addresses assigned to control these multiplexers on the address bus 36. When the microprocessor is informed that a new document image to be compressed is resident in the frame buffer, the proper addresses are written on the address bus 36 to cause the decoder 38 to activate SEL 2 and SEL 3 to cause the multiplexers 26 and 28 to connect the discrimination logic 30 to the address and data ports of the frame buffer 20. Those skilled in the art will appreciate that there must be provided some logic (not shown) to maintain the multiplexers 26 and 28 in the proper states during the document profiling stage. Typically, this would involve separate select inputs on each multiplexer which when activated cause the multiplexer to latch into a particular state corresponding to the activated select line. Such a system would work for purposes of practicing the invention, and is symbolized in FIG. 1 by the SEL 2 and SEL 3 signal lines each of which represents two select lines and two uniques addresses associated with activation of each said select line.

After, the document image has been profiled, the microprocessor 34 sends data to the compress logic via data bus 37 indicating the scan lines which are in text zones and the scan lines which are in graphics zones. The compress logic then begins generating addresses on address bus 42 which are coupled through the multiplexer 28 to the address port 24 of the frame buffer 20. These addresses cause the data in the frame buffer to be accessed scan line by scan line. The scan line number of each group of pixels from a line is compared to the scan line numbers that are in text zones, and if a match occurs, every other bit in the scan line is eliminated and every other scan line is eliminated to drop the resolution from the 200 dots per inch in the frame buffer 20 to the 100 dots per inch of the compressed image. The compressed scan line data is then output by the compress logic 32 to a compressed image storage memory 44 for storage. The scan line pixel data found to be graphic zones are passed directly to the compressed image storage memory 44 without alteration of the resolution.

The microprocessor functions to receive interrupts from the discrimination logic 30 and to read data from certain data storage registers to be described later in the discrimination logic and uses this data to build horizontal and vertical document profile data bases in a document profile database memory. Further, the microprocessor controls the sequence of operational modes the system enters such as the profile mode vertical pass and the profile mode horizontal pass and, finally, the compress mode. Further, the microprocessor examines the final horizontal and vertical profiles to determine regularity of blank spaces. That is, the microprocessor examines the regularity of blank spaces between text lines and the regularity of blank spaces in a supposed text line to determine whether a particular zone of a document image is a text or a graphics zone. The microprocessor also serves to transmit the data indicating which zones are text and which are graphic to the compress logic and sends data regarding which scan lines are in text lines to the discrimination logic for use in performing the horizontal profiling pass.

Figure 2:
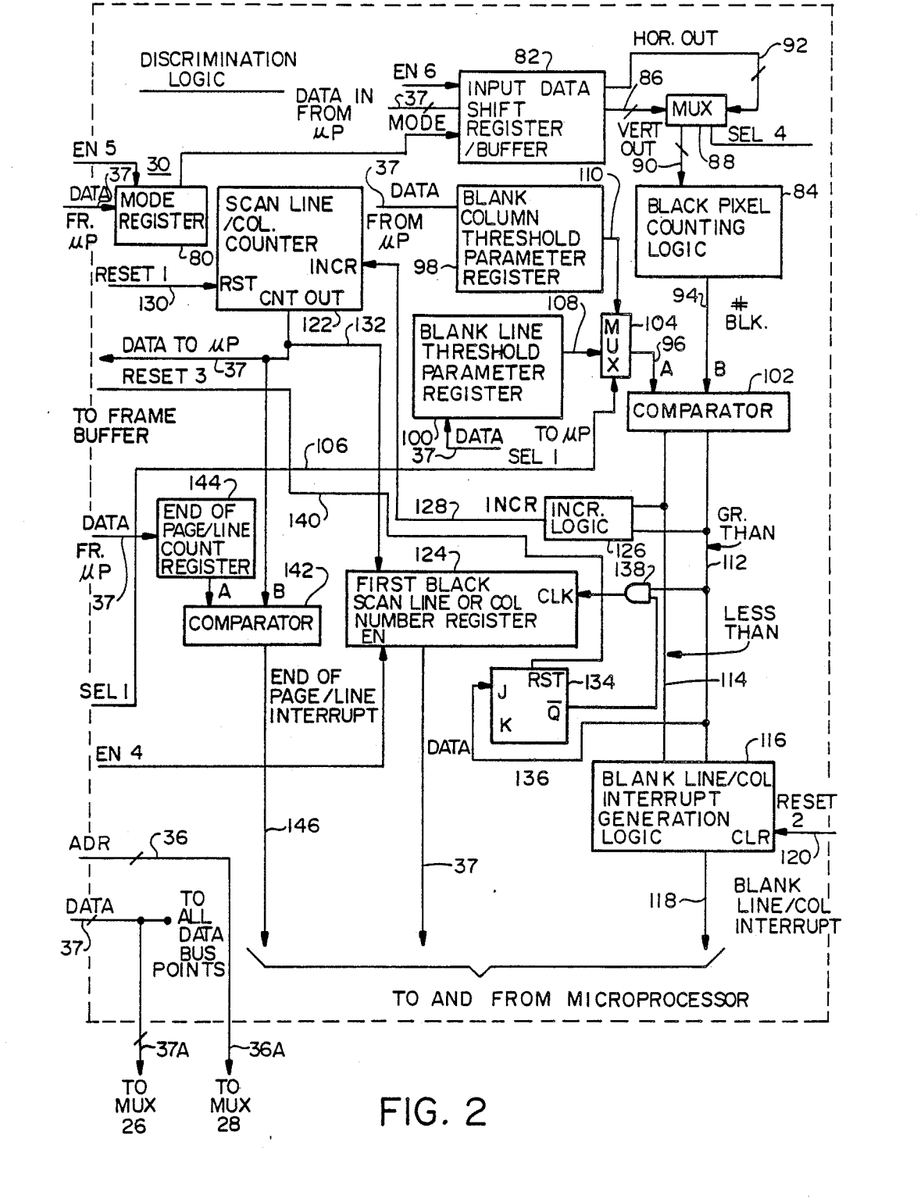
FIG. 2 is a block diagram of the discrimination logic.

Referring to FIG. 2, there is shown a block diagram of the discrimination logic. This logic serves to perform the examination of the data in the bit map of the image to be compressed and to discriminate between blank lines and lines which have black pixels in them for building the vertical profile. It also serves to discriminate between blank (white) and non-black (black) columns and informs the microprocessor of the locations of same to allow the microprocessor to build the horizontal profile.

The discrimination logic works as follows. When the microprocessor first starts profiling a document and wishes to perform a vertical pass, it addresses a mode control register 80 and writes a data bit or word therein which indicates that a vertical pass is to be performed. This is done by writing an address corresponding to the mode control register on the address bus 36 which causes decoder 38 to activate the EN 5 signal thereby connecting the inputs of the mode control register 80 to the microprocessor data bus 37. The proper mode control bit etc. may be written into the register 80. Hereafter when the microprocessor is spoken of as reading from or writing to a particular register or other logic, the details of writing the corresponding address such that the decoder 38 activates the appropriate enable or select line to enable the appropriate logic will be omitted as those skilled in the art appreciate how this is done. The microprocessor 34 then causes the multiplexers 26 and 28 to switch to states to allow the microprocessor to access data from the frame buffer 20 through the discrimination logic 30 and the extensions of the microprocessor address and data buses 37A and 36A. The microprocessor then accesses the 16 bits in the middle of the first scan line and writes them into an input buffer/shifter register 82 (hereafter the buffer) in parallel format.

The buffer 82 serves to receive the input pixel data to be examined and format it to the proper form for use by a black pixel counter 84. The buffer 82 consists of 16 or more registers each of which stores, for example, 16 bits. More bits may be stored if a swath larger than 16 bits is desired on the vertical pass. Further, the number of registers should be larger than the number of scan lines expected for any text line such that the pixels in each column of the text line may be simultaneously stored in the buffer 82 for shifting out in a manner which is described below. Each register has a parallel output which may be separately enabled by the microprocessor and which are wire-or'ed to a vertical output bus 86 selectively coupled to the input of the black pixel counting logic 84 through a multiplexer 88 and a bus 90. Each serial output from a register in the buffer 82 is gathered into a horizontal output bus 92 such that each register in the buffer 82 may shift out one bit and there will be presented to the black pixel counting logic 84 16 bits in parallel, one from each register. The horizontal output bus 92 is selectively coupled to the bus 90 by the multiplexer 88 which is controlled by the microprocessor 34. When the vertical profile is being built the multiplexer 88 is controlled to couple the buses 86 and 90 together, and when the horizontal profile is being built, the buses 92 and 90 are coupled together.

The black pixel counting logic may be any logic which can take the parallel pixel data input on the bus 90 and determine the number of black pixels in it and output a binary number which indicates the number of black pixels on a bus 94. In the preferred embodiment a PLA. EPROM or ROM is used with the logic relationship between the input on the bus 90 and the output on the bus 94 being such that the above defined criteria is met. In other embodiments, a shift register and counter could be used or any other logic which would perform the function within an acceptable time.

The output binary number on the bus 94 is compared to another binary number on a bus 96 which indicates a user defined maximum number of black pixels to classify a particular scan line as a white or blank line, or in the case of a horizontal scan, to classify a particular column as a blank column. These two user defined numbers are stored by the microprocessor in two registers 98 and 100. Register 98 stores the threshold defining a blank column, while register 100 stores stores the threshold defining a blank line. The microprocessor 34 loads these threshold numbers by enabling each individually through use of the decoder 38 (enable signals not shown) and the data bus 37. The contents of these two registers are selectively coupled to the A input of a comparator 102 which has its B input coupled to the bus 94 by a multiplexer 104. The multiplexer 104 is controlled in its selection by the microprocessor 34 through the decoder 38 and the SEL 1 signal on line 106. When in the vertical profile mode, the microprocessor causes the multiplexer 104 to couple the data output 108 to the comparator 102. When in the horizontal profile mode, the microprocessor causes the multiplexer 104 to couple the data output 110 of the register 98 to the comparator 102.

The comparator compares the number of black pixels in the incoming image data to the number of allowable black pixels on the bus 96 and generates two signals. The first signal on a line 112 is active when the number at the B input is greater than the number at the A input to the comparator 102. The second signal on a line 114 is active when the number at the B input is less than the number at the A input. Both of these signals are coupled to a blank line interrupt generation circuit 116. The purpose of this circuit is to generate a BLANK LINE/-COL INTERRUPT signal on a bus 118 the first time a blank line or blank column is found each time after a black line or column is found as indicated by the activation of the signal on the line 112. The service routine for this interrupt will be described below. The interrupt generation logic could be implemented with a flip flop or with other logic which will be apparent to those skilled in the art. The logic will be reset by the RESET 2 signal on the line 120 form the decoder 38 as part of the interrupt service routine.

During a vertical pass, the discrimination logic functions to find the first black scan line in each black "run" (collection of adjacent black scan lines) and to then switch modes to generate an interrupt upon finding the next white line following the first black scan line in the run. This is done by using a counter 122 to count scan lines to generate addresses for access of pixel data and a first black register 124 to store the scan line number of the first black scan line found. The scan line counter is incremented by incrementation logic 126 through a signal INCR generated thereby on line 128. The incrementation logic 126 is coupled to the lines 112 and 114 so as to generate an incrementation pulse each time either of the signals on line 112 or 114 becomes active in the sense of assuming a defined state meaning a particular event has occurred or is supposed to occur in response to the signal. At the beginning of a vertical pass, the microprocessor causes the decoder 38 to generate the RESET 1 pulse on line 130 to reset the counter 122 to zero. The microprocessor then reads this count output via data bus 37 and calculates the proper offset to generate an address to access the 16 bits in the middle of this first line, scan line 0. This data is then written into the buffer 82. The comparator 102 then compares the number of black pixels therein to the threshold on bus 108 and activates the signal on line 112 if the comparisone indicates the number of black pixels is greater than or equal to the threshold or the signal on line 114 if the number of black pixels is less than the threshold. Either signal activates the incrementation logic to generate an INCR pulse to increment the counter 122 to the count of 1 from which the microprocessor calculates the address of the middle 16 bits in the second scan line, scan line 1. If the GR. THAN signal on line 112 was activated, the first black scan line or column number storage register 124 is clocked and the data at its data input, bus 132 coupled to the count out output of the counter 122 is loaded into the register for later reading by the microprocessor. If not the process of reading in 16 bit swaths from the middle of scan lines continues until the first black scan line is found. The microprocessor in calculating addresses for access of the 16 bit swaths from the middle of the scan lines, in the preferred embodiment, does the calculation and enables one of the 16 registers in the buffer 82. In other embodiments, each calculation results in an access to the frame buffer 20.

When the first black register 124 is loaded, the signal on the line 112 also sets the logic 116 in a state such that the next activation of the signal on the line 114 will result in generation of the interrupt signal on line 118.

If the first black line was the top of a text line, several black scan lines will follow before the next white scan line is found. Each of these following black scan lines will cause the comparator 102 to activate the GR . THAN signal on the line 112. However, the first activation of the GR. THAN signal also sets a flip flop 134 via a line 136 coupled to the GR. THAN signal line. The Q not output of the flip flop 134 is coupled to an input of an AND gate 138 which has one input coupled to the GR. THAN signal output line 112 of the comparator 102. The output of the AND gate 138 is the coupled to the clock input of the first black scan line or column number register 124. Thus, as soon as the first black scan line or column register 124 (hereafter the first black register) is loaded, the flip flop 134 is set and the AND gate 138 prevents further clocking in of the current count from the scan line/column counter 122 thereby freezing the contents of the first black register 124 at the scan line number of the first black scan line in the current run. The interrupt service routine for each interrupt resets the flip flop 134 via the RESET 3 signal on the line 140 thereby preparing the discrimination logic to find the next black line for the next black run.

The interrupt service routine which is performed when the interrupt on line 118 is activated serves to collect the data needed to quantify the size of the blank space in scan lines which the discrimination logic has detected. To do this the microprocessor reads the contents of the first black register 124 and the current count of the scan line/column counter 122 at the time of the interrupt (and subtracts one from the current count to get the scan line number of the first white line). When the microprocessor has this information, for each black run, it can calculate the first and last scan line number in each text line and the size in scan lines of the blank space between text lines. This information is used to write the records of the vertical profile. The interrupt service routine also resets the flip flop 134 and the blank line/column interrupt generation logic 116 by activating the signals REST 2 and RESET 3.

The foregoing process of finding the start and end of black runs continues until the current count equals the scan line count of the last scan line on the page. This condition is detected by a comparator 142 and an end of page/line count register 144 which stores data written therein by the microprocessor 34 indicating the scan line number of the last scan line on the page for the vertical pass and the last column in the text line in the horizontal pass. The comparator generates and END OF PAGE/LINE INTERRUPT signal on line 146 when the current count equals the contents of the register 144.

When the interrupt on line 146 indicates that the end of the page has been reached in the vertical pass, the microprocessor causes the decoder 38 to activate the RESET 1 signal to reset the scan line/column counter to zero in preparation for the horizontal pass. The microprocessor then loads the register 144 with the number of columns in each text line, and causes the multiplexer 104 to to select the output 110 of the blank column threshold parameter register 98 for coupling to the A input of the comparator 102.

Figure 3:
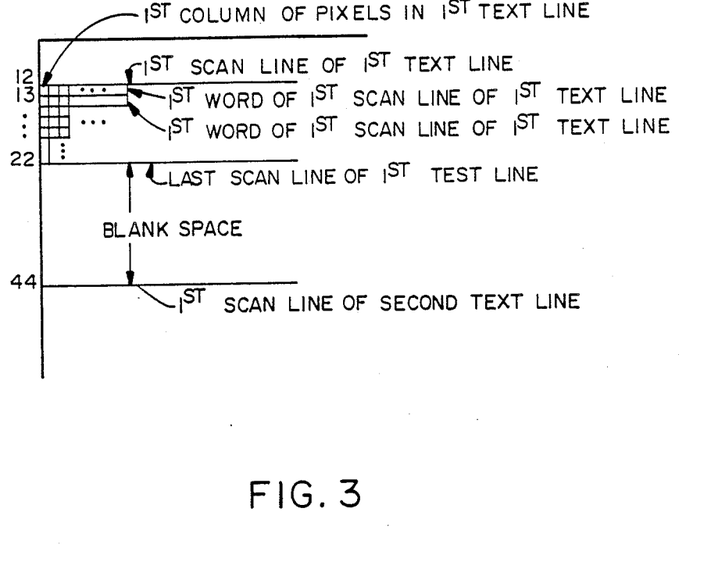
FIG. 3 is the diagram of the rasterization of a typical text zone.

The discrimination logic 30 is then ready to begin the processing for the horizontal pass. First, the microprocessor reads the vertical profile and determines the scan line number of the first scan line in the first line of text and the scan line number of the last scan line in the first line of text. The microprocessor then calculates the address of the first bytes or words in each scan line in the line of text being processed and accesses these bytes or words from the frame buffer. One by one they are then written into successive registers in the buffer 82 such that they may be shifted out simultaneously to obtain all the bits in the first column of the text line simultaneously at the input to the comparator 102. This process is illustrated in FIG. 3. The first word of the first scan line of the first text line would be stored in the first register in the buffer 82. The first word of the second scan line of the first text line would be stored in the second register. This process would continue until all the first words of all the scan lines in the first text line were stored in the registers of the buffer 82. The registers would then be controlled by the microprocessor to shift their contents out on the individual lines of the horizontal output bus 92. The first bits out of each of the registers would comprise the first column of pixels in the first text line. This first column would be processed by the black pixel counting logic and all other processing by the discrimination logic would continue as described above for the vertical pass. The scan line counter 122 would be incremented as the number of black bits in each column was compared to the blank column threshold number in the register 98. The first column which was found to be black would have its column number clocked into the first black register 124, and the next white column would cause the interrupt generation logic 116 to generate the BLANK LINE/COL INTERRUPT signal on the line 118. The microprocessor in response to this interrupt would then read the contents of the first black register 124 and the current count from the scan line/column counter (and would subtract one therefrom). Flip flop 134 and the interrupt generation logic 116 would then be reset and the discrimination logic would then be primed to find the next black run on the next line being processed. This information gathered during each service routine would be used to calculate the length in columns of each white run which would in turn be used to build the horizontal profile in the profile database memory 46.

After the first text line is processed as above described, the microprocessor 34 would reset the scan line counter 122 and examine the vertical profile to determine the scan line numbers of the first and last scan lines in the second text line. The addresses of the first bytes or words in each of these scan lines would then be calculated, and these bytes or words would be accessed and loaded into the registers of the buffer 82. Processing would then continue as described above to profile the second text line.

In the manner described above, the horizontal profile, i.e., the number and length in columns of all the blank spaces in each text line may be calculated. Similarly, the number and length in scan lines of all blank spaces between text lines may be calculated and stored in the vertical profile. Those skilled in the art will appreciate that other equivalent ways of determining the number and size of blank spaces both vertically and horizontally exist. For example, the discrimination logic may be structured so that an interrupt is generated on each color change and the interrupt service routine could read data indicating the type of color change it was, i.e., from white to black or from black to white, and could read the current count from the scan line/column counter 122. From this data, the microprocessor 34 could calculate the length of any run be it black or white. Another equivalent embodiment for the discrimination logic would use a blank line/column counter. In this embodiment, the blank line/column counter would be enabled on any color change from black to white and would increment each time the LESS THAN signal on line 114 from the comparator was activated. Upon a color change from white to black, an interrupt would be generated. The interrupt service routine for this interrupt would then read the current count of the blank line/column counter and use this count for writing the horizontal and vertical profiles. Any logic design for the discrimination logic which will allow the microprocessor 34 to either calculate or read the size of the blank spaces both vertically or horizontally will suffice for purposes of practicing the invention.

The next phase in the profiling process is to map out the zones of the document into text and graphics zones. During this phase, the microprocessor 34 reads the size of each blank space between text lines in the vertical profile and finds the smallest space, the Smallest Interline Space or SIS. Then all the vertical blank spaces are compared to the SIS and all zones in the document (defined by boundaries stated in terms of scan line number) where the vertical blank spaces are integer multiples of the SIS are assumed to be text zones. This comparison is done with a threshold as some variance is allowed, i.e., not every blank vertical space has to be an integer multiple, but most of them must be for a particular zone to be assumed to be text. Next, the blank horizontal spaces in the zones assumed to be text are examined and the smallest intercharacter space, the ICS, on each presumed text line is found. All the other blank horizontal space are then found in the horizontal profile and compared to the ICS to determine how many of them are integer multiples of the ICS. Again a threshold is used for the maximum number of blank spaces which can be non-integer multiples before a zone is classified non-text. When the threshold is not exceeded in a zone, the zone is classified text and its boundaries in scan line number terms are recorded.

Finally, the third phase of the compression process is entered. In this phase, the microprocessor 34 causes the multiplexers 26 and 28 to switch so that the compress logic 32 is controlling the address and data ports of the frame buffer 20. The microprocessor 34 then prepares a starting header with a field therein which indicates that the data which follows the header will be compressed at either 100 or 200 dots per inch. The microprocessor 34 then calculates where in the compressed image storage memory 44 the compressed image is to start and causes two multiplexers 160 and 162 to switch so as to select their inputs coupled to the microprocessor address bus 36 and data bus 37 for application respectively to the data and address ports 164 and 166 respectively of the compressed image storage memory. The microprocessor 34 then writes the starting header at the calculated location (it could be any arbitrary address or the first address in the memory preferably—whatever is consistent with the needs of the system)

The microprocessor 34 would then send the following information to the compress logic 32: the starting address for the first scan line in the first zone to compress: the end address of the zone: the compression mode, i.e., 100 dots per inch or 200 dots per inch: the number of pixels in each line and the DMA address in the compressed image storage memory 44 where the compress logic should store the first compressed data. In other embodiments, the microprocessor could send different information to the compress logic. Specifically, the microprocessor 34 could send: the starting address of the zone to be compressed in the source frame buffer 20: the number of can lines in the zone; the number of pixels in each line: the DMA address of where the compress logic is to store the first compressed data: and the compression mode for the zone. This data would be sent on the data bus portion 37A coupled to the compress logic using the address bus portion 36A coupled to the compress logic 32 to enable the proper registers therein. A decoder in the compress logic (not shown) would enable each register in the compress logic as the data to be stored therein arrived on the data bus segment 37A.

The microprocessor then cause the multiplexers 160 and 162 to switch to couple the DMA address and DMA data buses 170 and 172, respectively, to the address and data ports 166 and 164, respectively, of the compressed image storage memory. Then the microprocessor would signal the compress logic to begin compressing the data in the frame buffer 20.

The compress logic 32 is comprised of registers, counters, a comparator and a decoder to allow the registers to be selectively enabled. There is a DMA source address counter and a DMA start address register. The microprocessor 34 loads the DMA starting address of the beginning of a zone to be compressed in the DMA starting address register, and DMA data output from the frame buffer 20 occurs as the DMA source address counter generates sequential addresses starting from the starting address and applies them to the address bus 24 of the frame buffer 20. The compress logic also contains DMA byte counter/line counter (depending upon which embodiment is used) which is incremented each time a byte/line is processed. The count output of this counter plus the starting address is compared to the contents of a DMA ending address register which is loaded by the microprocessor with the end address for each zone to be processed as it is processed. In some embodiments, the information from the microprocessor will contain both the starting address in the source frame buffer and the number of bytes in the zone to be processed. In such embodiments, the current count of the DMA byte counter may be compared directly to the contents of a register which is loaded by the microprocessor with the byte count in the zone to be compressed.

There is also a mode register which is loaded with the data regarding whether compression to 100 dots per inch is to be performed on the zone currently being processed or whether no change is to be made. The compress logic reads the contents of this logic, and if 100 dots per inch compression is to be performed, an algorithm is performed on the incoming data to ignore every other bit on the first line, ignore the second line entirely, then ignore every other bit on the third line and so on until the end of the zone is reached. If 200 dots per inch is indicated, no change is made on the data as it arrives from the source frame buffer 20, and the data is passed directly to the data port 164 of the compressed image storage memory 44.

The compress logic also has a similar set of registers and counters which are used to control the address port of the destination frame buffer, compressed image storage memory 44. A DMA destination starting address register is loaded with the address in the memory 44 where the first compressed date is to be stored (right after the starting header stored by the microprocessor). A DMA destination address counter starts from the starting address for the destination register and generates DMA addresses for storage of the compressed data in the memory 44. There is also a DMA destination byte count/end address register that stores data derived from the compressed data regarding how big the zone that is being compressed is after compression. When the interrupt is generated as described above indicating that the end of the zone to be compressed has been reached, the microprocessor service routine for this interrupt reads the data in the DMA destination byte count/end address register to determine the last address in which the compressed data from the first zone processed resides. This address is used to calculate the address (end address plus one) for the beginning of the end of zone header which delimits the end of the zone just compressed. This end header is then generated by the microprocessor and written into the compressed image storage memory 44.

After the current zone is compressed, the microprocessor causes all the counters to be reset and reloads all the appropriate registers with the pertinent information for the next zone to be processed. After all zones are processed as above the compression is complete.

Although the invention has been described in terms of the preferred embodiment and other embodiments described herein, those skilled in the art will appreciate other modification that can be made without departing from the true spirit and scope of the invention. All such modifications are intended to be included within the scope of the claims appended hereto.

What is claimed is:

1. An apparatus for comprising a bit mapped image stored at a first resolution to a compressed image which has zones stored at said first resolution and zones stored at a second resolution comprising:

means for profiling digital data representing said bit mapped image to determine where probable zones of text are located by determining the smallest space of a selected color and examining other spaces of the same color to determine whether the sizes of these other spaces is an integer multiple of said smallest space of said selected color and for determining where probable zones of graphics are located by examining patterns of blank spaces in the image; and means coupled to said means for profiling for compressing said zones of text at said second resolution and for converting said compressed zones to text to compressed data and for storing said compressed data along with said bit mapped data representing said zones of graphics as said compressed image.

2. A method of compressing an image of a document into less storage space comprising the steps of:

mapping the document image into zones of text and zones of graphics by examining the regularity of the sizes of blank spaces in two axes of the image to determine how many blank spaces along each axis of profile have sizes which are integer multiples of the size of the smallest blank space in the corresponding axis of profile and for labelling as zones of text those areas of the image where the number of blank spaces which have sizes which are integer multiples of the smallest blank space on the corresponding axis of profile exceeds a predetermined threshold;

compressing the zones of text by eliminating predetermined data therefrom while not eliminating data from zones of graphics.

3. A method for compressing the pixel data of a raster scanned image of a document into less storage space comprising the steps of:

reading a plurality of pixels from each scan line along a path orthogonal to the long axis of text lines and comparing the number of black pixels in the pixels read from each scan line to a first user defined threshold;

repeating the above step for each scan line in the image;

recording the location of each color change between a scan line where the number of black pixels exceeds said first threshold and a scan line where the number of black pixels is less than said first user defined threshold;

forming a first profile database consisting of information from which the location and size of each probable text line, as defined by the first scan line which has a number of black pixels which exceeds said first user defined threshold followed by the first scan line with a number of black pixels which is less than said user defined threshold, and from which the location and size of each blank space between probable text lines in said path can be derived where a blank space is defined as one or more contiguous scan lines where the number of black pixels is less than the user defined threshold;

reading a plurality of pixels which define a column of pixels in one of said probable text lines defined in the step next above and comparing the number of black pixels to a second user defined threshold;

repeating the step next above for each column in each text line identified in said first profile database;

recording the size of each blank space in each said probable text line as defined by contiguous columns having a number of black pixels which does not exceed said second user defined threshold in a second profile database;

determining the smallest blank space in each of said first and second profiles and comparing the number of other blank spaces in each profile which are not under integer multiples of the smallest blank space in each profile to a third and fourth user defined threshold;

mapping the image into zones of text where the third and fourth thresholds are not exceeded and zones of graphics where said third and fourth thresholds are exceeded; and compressing the zones which are determined by the above steps to be text by eliminating certain data therefrom but not eliminating data from zones determined to be graphics.

* * * * *